United States Patent
Werlberger et al.

(10) Patent No.: US 12,499,185 B2
(45) Date of Patent: Dec. 16, 2025

(54) EXTENDED REALITY STREAMING WITH INTEGRATED COPYRIGHT PROTECTION

(71) Applicant: Holo-Light GmbH, Innsbruck (AT)

(72) Inventors: Alexander Werlberger, Haimhausen (DE); Philipp Landgraf, Altenmarkt a.d. Alz (DE)

(73) Assignee: Holo-Light GmbH, Innsbruck (AT)

( * ) Notice: Subject to any disclaimer, the term of this patent is extended or adjusted under 35 U.S.C. 154(b) by 43 days.

(21) Appl. No.: 18/322,147

(22) Filed: May 23, 2023

(65) Prior Publication Data

US 2023/0401291 A1 Dec. 14, 2023

(30) Foreign Application Priority Data

Jun. 10, 2022 (EP) .................................. 22178326

(51) Int. Cl.
G06F 21/10 (2013.01)
(52) U.S. Cl.
CPC .......... *G06F 21/10* (2013.01); *G06F 21/1014* (2023.08)
(58) Field of Classification Search
CPC ...... G06F 21/10; G06F 21/1014; G06F 3/011; G06Q 2220/16; H04N 21/835; H04N 21/816
See application file for complete search history.

(56) References Cited

U.S. PATENT DOCUMENTS

2015/0220620 A1* 8/2015 Arana .............. H04N 21/43072
   707/741
2017/0332117 A1* 11/2017 Haritaoglu ..... H04N 21/234363
2020/0066042 A1* 2/2020 Marsh ................... G06T 19/006
2021/0279695 A1* 9/2021 Rice ......................... G06Q 20/12
2022/0331702 A1* 10/2022 van Welzen .......... A63F 13/335

OTHER PUBLICATIONS

EP Application No. 22178326.9, Extended European Search Report mailed Dec. 5, 2022, 8 pages.
EP Application No. 22178326.9, Office Action mailed Mar. 17, 2025, 6 pages.
3GPP, "3rd Generation Partnership Project; Technical Specification Group SA; Support of 5G Glass-type Augmented Reality/Mixed Reality (AR/MR) devices; (Release 17)", 3GPP Standard; Technical Report; 3GPP TR 26.998, Mobile Competence Center; Sophia-Antipolis, France, No. V17.0.0, Mar. 31, 2022, 119 pages.

* cited by examiner

*Primary Examiner* — Catherine Thiaw
(74) *Attorney, Agent, or Firm* — Gilliam IP PLLC

(57) ABSTRACT

An extended reality (XR) streaming system comprises an asset database and at least one XR streaming instance. The asset database stores asset data that is associated with a plurality of different digital assets, wherein the asset data comprises rendering data and copyright data associated with each digital asset. The rendering data corresponds to data that is necessary for the at least one XR streaming instance to render an XR image associated with the respective digital asset. The XR streaming instance generates an asset request, wherein the asset request corresponds to a request for a particular digital asset. The asset database transmits the rendering data associated with the requested digital asset to the at least one XR streaming instance based on the asset request and based on the copyright data. The at least one XR streaming instance generates an XR image stream based on the transmitted rendering data.

20 Claims, 3 Drawing Sheets

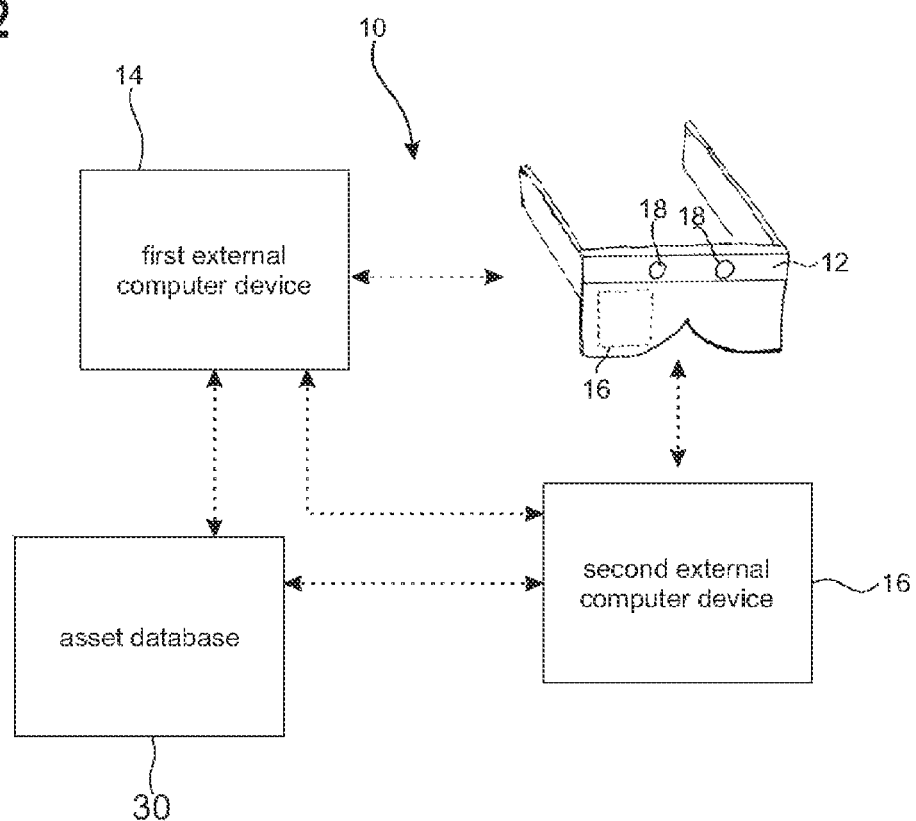

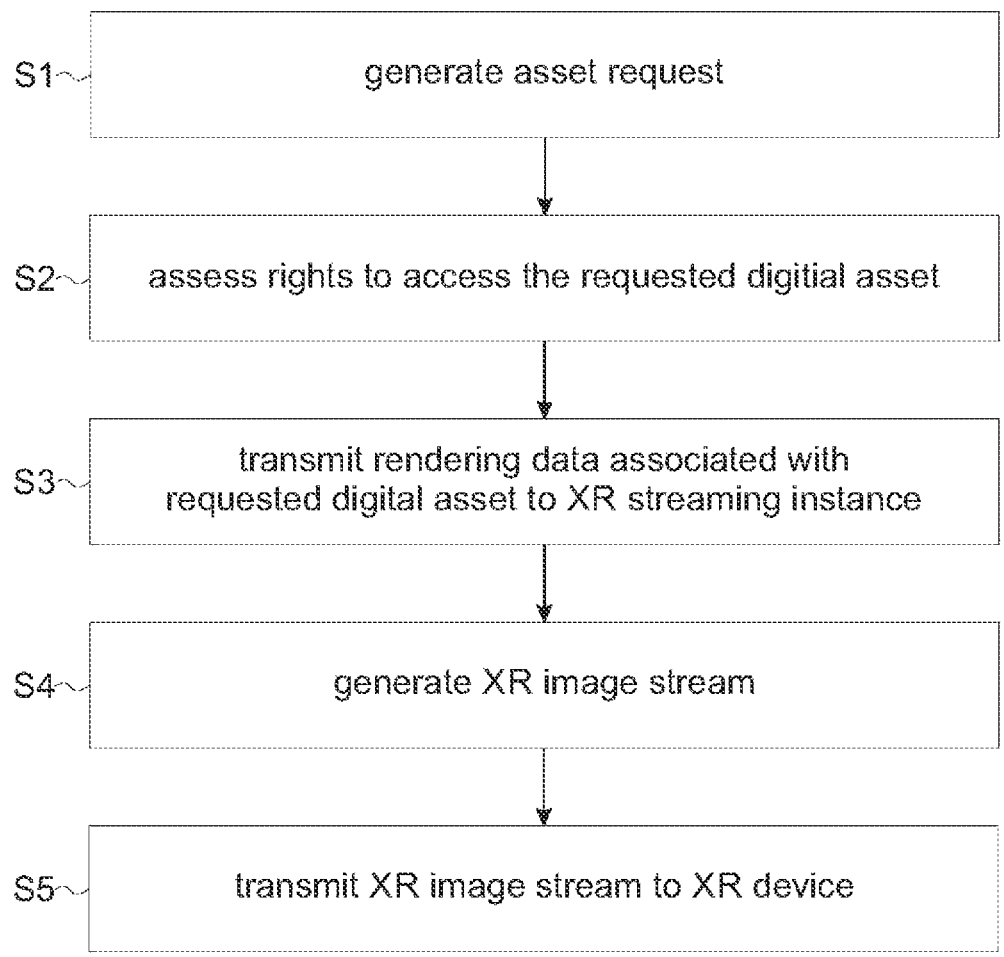

EXTENDED REALITY STREAMING WITH INTEGRATED COPYRIGHT PROTECTION

FIELD OF THE DISCLOSURE

Embodiments of the present disclosure generally relate to an extended reality (XR) streaming system with integrated copyright protection. Embodiments of the present disclosure further relate to an XR streaming method of streaming an XR image stream from at least one XR streaming instance to an XR device.

BACKGROUND

In certain XR applications, XR images to be displayed on an XR device of a user are streamed from an XR application instance that is implemented in an external computer device to the XR device.

Individual users may have digital assets for the XR application that the user does not want other users to copy freely.

For example, the user may own a three-dimensional (3D) model of a machine, such as a car. The user may want to show the 3D model to potential customers, e.g. in a presentation, utilizing augmented reality, mixed reality, or virtual reality, wherein each potential customer may have an XR device that is capable of displaying the 3D model.

However, if the 3D models are transferred to the XR devices, there is a risk of the data of the 3D model being captured and copied without permission of the user.

Thus, there is a need for an XR streaming system and an XR streaming method with integrated copyright protection.

SUMMARY

Embodiments of the present disclosure provide an extended reality (XR) streaming system with integrated copyright protection, wherein the XR streaming system comprises an asset database and at least one XR streaming instance. The asset database is configured to store asset data that is associated with a plurality of different digital assets, wherein the asset data comprises rendering data and copyright data associated with each digital asset. The rendering data corresponds to data that is necessary for the at least one XR streaming instance to render an XR image associated with the respective digital asset. The XR streaming instance is configured to generate an asset request, wherein the asset request corresponds to a request for a particular digital asset. The asset database is configured to transmit the rendering data associated with the requested digital asset to the at least one XR streaming instance based on the asset request and based on the copyright data. The at least one XR streaming instance is configured to generate an XR image stream based on the transmitted rendering data.

Therein and in the following, the term "XR image stream" is understood to denote a data stream corresponding to XR images, wherein the XR images are to be displayed on a display of a user-side XR device.

The term "XR device" is understood to denote an electronic device that is configured to display an XR image, i.e. an augmented reality (AR) image, a mixed reality (MR) image, and/or a virtual reality (VR) image.

For example, the XR device may be a head-mounted display, e.g. an electronic wearable having the shape of glasses. However, it is to be understood that the XR device may be any other XR-capable electronic device, e.g. as a smartphone or as a tablet.

Moreover, the term "XR image" is understood to denote at least one virtual image.

In the case of augmented reality or mixed reality, the XR image corresponds to at least one virtual image that is superimposed over reality.

For example, the XR device may be a head-mounted display with a semi-transparent display, wherein the virtual image is displayed on the semi-transparent display, such that the user can directly see the environment through the semi-transparent display, but with the virtual image superimposed.

As another example, the XR device may be a head-mounted display that is optically opaque. In this case, the head-mounted display may comprise at least one internal camera, particularly several internal cameras being configured to capture images of the environment of the head-mounted display. The real images captured by means of the internal camera are superimposed with the virtual image(s), and the resulting superposition of the real image(s) and the augmented reality image(s) is displayed on a display of the head-mounted display.

As another example, the XR device may be a smartphone or a tablet, wherein an image captured by means of a camera of the XR device is superimposed with the at least one virtual image, and the resulting image is displayed on a display of the XR device.

In the case of virtual reality, the XR image corresponds to a virtual image being displayed on a display of the XR device.

For example, the XR device may be a head-mounted display that is optically opaque. The VR images may be displayed on a display of the head-mounted display.

Further, the term "XR streaming instance" is understood to denote suitable hardware, such as suitable circuits, suitable software, or a combination of hardware and software that is configured to execute a certain XR application.

For example, the XR application may be an engineering application that is configured to generate XR images associated with a 3D model of an object, e.g. of a car, of an engine, or of any other object.

According to the present disclosure, a central database is provided that can be accessed by the at least one XR streaming instance, namely the asset database. The data that is necessary for the XR streaming instance for rendering XR images associated with a particular digital asset, namely the rendering data, is transmitted from the asset database to the XR streaming instance upon request.

In general, the asset database may assess whether the respective XR streaming instance or rather a user associated with the respective XR streaming instance is allowed to access the digital asset based on the copyright data, thereby providing a first layer of copyright protection.

In other words, based on the copyright data, the asset database may grant or deny access to the rendering data associated with a particular digital asset, such that the XR image stream associated with a particular digital asset is only generated if the respective XR streaming instance or rather a user associated with the respective XR streaming instance has the rights to access the digital asset.

Further, according to the present invention, the rendering data is only transmitted to the XR streaming instance, but not to a user-side XR device.

In fact, only the XR image stream comprising rendered XR images associated with the rendering data is transmitted to the user-side XR device. Thus, there is no risk of the rendering data being copied by the user-side XR device without permission, thereby providing a second layer of copyright protection.

For example, a company may operate both the asset database and the at least one XR streaming instance. Thus, the rendering data is never transmitted to a device that is not being operated by the company. Accordingly, it is ensured that rendering data cannot be copied without permission of the company, for example by potential customers or by employees of the company.

According to an aspect of the present disclosure, the asset database is connectable with a plurality of different XR streaming instances simultaneously. In other words, the asset database can be accessed by a plurality of different streaming instances simultaneously. Accordingly, the rendering data associated with the digital assets does not have to be stored locally at each XR streaming instance, but can be centrally saved in the asset database.

For example, the plurality of different streaming instances may be connected to the asset database via a wide area network (WAN), via a mobile communication network, e.g. a 4G or 5G network, or via the internet.

According to a further aspect of the present disclosure, different XR streaming instances are configured to execute the same or different XR applications. In other words, the asset database or rather the rendering data stored in the asset database may be compatible with a plurality of different XR applications.

For example, different XR streaming instances may employ different rendering engines, such as the Unity® game engine or the Unreal Engine® game engine, i.e. the different XR applications may be implemented in different rendering engines.

As another example, the different XR applications may correspond to different types of XR applications. For example, one XR streaming instance may be configured to execute an XR engineering application, a further XR streaming instance may be configured to execute an XR computer game, and another XR streaming instance may be configured to execute an XR metaverse application.

Instead of saving adapted data for each digital asset for each different XR application, a single database storing the rendering data is used, thereby reducing the necessary memory for storing the rendering data.

Further, a single source of truth is provided by the XR streaming system, particularly the asset database. In case a file or rather data gets changed, it can still be ensured that all users having access to the asset database have the same version, thereby ensuring that not a tremendous number of copies has to be used. In addition, it can be ensured that no comparisons have to be done in order to identify which one of the several copies is the right one. Accordingly, it is also possible to have version and change tracking.

In an embodiment of the present disclosure, the rendering data comprises 3D model data and/or shader data. Thus, upon request the 3D model data and/or the shader data associated with the requested digital asset is forwarded to the XR streaming instance. Based on the 3D model data and/or the shader data, the XR streaming instance renders the XR images to be displayed on a user-side XR device, thereby generating the XR image stream.

In a further embodiment of present disclosure, the copyright data associated with each digital asset is established as a blockchain, respectively. Thus, unauthorized manipulations of the copyright data can be immediately detected, as such manipulations usually lead to inconsistencies of the hash-values of the individual blocks of the blockchain. In other words, the copyright data is safe from unauthorized manipulations.

The copyright data, particularly the blockchain, may comprise information on a (current) owner of the respective digital asset, information on a transaction history of the respective digital asset, information on usage rights, i.e. which users or XR streaming instances are allowed to access the respective digital asset, and/or a hyperlink to the digital asset, particularly a hyperlink to the rendering data associated with the digital asset.

Particularly, the copyright data associated with at least one of the digital assets is a non-fungible token (NFT). Thus, the copyright data may comprise an NFT for each (unique) digital asset, such that unambiguous copyright information is provided for each unique digital asset. In other words, a user may own unique digital assets that are provided with unique copyright information.

A further aspect of the present disclosure provides that the asset database is a cloud database being distributed over a plurality of servers. The asset data associated with a particular digital asset may be stored on one of the servers, on a predefined sub-set of the plurality of servers, or on all servers, respectively.

Storing the asset data, particularly the rendering data associated with a particular digital asset only on a single server, respectively, reduces the overall memory requirements for storing the asset data.

On the other hand, storing the asset data for each digital asset on multiple servers may reduce the latency for transmitting the rendering data to the at least one XR streaming instance, as the XR streaming instance may select a server having the lowest latency.

The copyright data may be saved on a single server. Alternatively, the copyright data may be decentrally saved on a predefined subset of the plurality of servers or on all servers of the plurality of servers. Accordingly, identical copies of the copyright data may be saved on the predefined subset of the plurality of servers or on all servers of the plurality of servers, for example as a blockchain and/or as an NFT.

In other words, the predefined subset of the plurality of servers or all servers of the plurality of servers may establish a blockchain network, wherein the individual servers correspond to nodes of the blockchain network.

Accordingly, changes of the copyright data are transmitted to the predefined subset of the plurality of servers or to all servers of the plurality of servers, such that the copyright data saved on each server is synchronized.

According to another aspect of the present disclosure, the at least one XR streaming instance is implemented on at least one server. Particularly, a plurality of XR streaming instances may be implemented on a single server and/or on different servers.

The different servers may be interconnected with each other, e.g. via a wide area network (WAN) or via the internet.

However, it is also possible that the XR streaming instances are assigned to a virtual private local area network (LAN) or a LAN which is more secure, particularly wherein it is (nearly) impossible to attack an in-between connection, provided that the XR application only needs to be available in a local area and the users are located close to each other.

Particularly, different XR streaming instances that are implemented on a single server may be associated with different XR applications.

Different XR streaming instances that are implemented on different servers may be associated with the same XR application or with different XR applications.

In an embodiment of the present disclosure, the at least one XR streaming instance and the asset database are implemented on the same server or on the same plurality of servers. This way, the download time for downloading the rendering data from the asset database to the at least one XR streaming instance is significantly reduced, leading to a better user experience with reduced lags. In other words, the time necessary for loading the data used for generating the XR image stream is reduced.

Accordingly, the at least one XR streaming instance and the asset database may be implemented in a common cloud computing network being established by the plurality of servers.

A further aspect of the present disclosure provides that the XR streaming instance is configured to transmit the XR image stream to an XR device, wherein the XR device is configured to display the XR image stream, particularly wherein the rendering data is not transmitted to the XR device. Thus, only the XR image stream comprising rendered XR images associated with the rendering data is transmitted to the user-side XR device. Accordingly, there is no risk of the rendering data being copied by the user-side XR device without permission.

The XR device may be a portable electronic device, particularly a head-mounted display, a smartphone, or a tablet, as already described in more detail above.

In an embodiment of the present disclosure, the asset request and the copyright data each comprise user information being associated with a particular user. For example, the asset request may comprise a unique identifier associated with the particular user being connected to the XR streaming instance. The copyright data comprises information whether that particular user, i.e. the user associated with the unique identifier, is allowed to access the requested digital asset.

Embodiments of the present disclosure further provide an extended reality (XR) streaming method of streaming an XR image stream from at least one XR streaming instance to an XR device. The XR streaming method comprises:
- generating, by means of the at least one XR streaming instance, an asset request, wherein the asset request corresponds to a request for a particular digital asset;
- transmitting the asset request to an asset database, wherein the asset database is configured to store asset data that is associated with a plurality of different digital assets, wherein the asset data comprises rendering data and copyright data associated with each digital asset;
- transmitting, by means of the asset database, the rendering data associated with the requested digital asset to the at least one XR streaming instance based on the asset request and based on the copyright data; and
- generating, by means of the at least one XR streaming instance, an XR image stream based on the transmitted rendering data.

Particularly, the XR streaming system described above may be configured to perform the XR streaming method. In other words, the XR streaming system described above may be used to perform the XR streaming method.

Regarding the advantages and further properties of the XR streaming method, reference is made to the explanations given above with respect to the XR streaming system, which also holds for the XR streaming method and vice versa.

According to an aspect of the present disclosure, the XR image stream is transmitted to an XR device, wherein the XR device is configured to display the XR image stream, particularly wherein the rendering data is not transmitted to the XR device. Accordingly, only the XR image stream comprising rendered XR images associated with the rendering data is transmitted to the user-side XR device, but not the rendering data itself. Thus, there is no risk of the rendering data being copied by the user-side XR device without permission of the owner of the digital asset.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 2 schematically shows an exemplary embodiment of the XR streaming system of FIG. 1; and FIG. 3 shows a flow chart of an XR streaming method according to the present disclosure.

DETAILED DESCRIPTION

Figure 1:
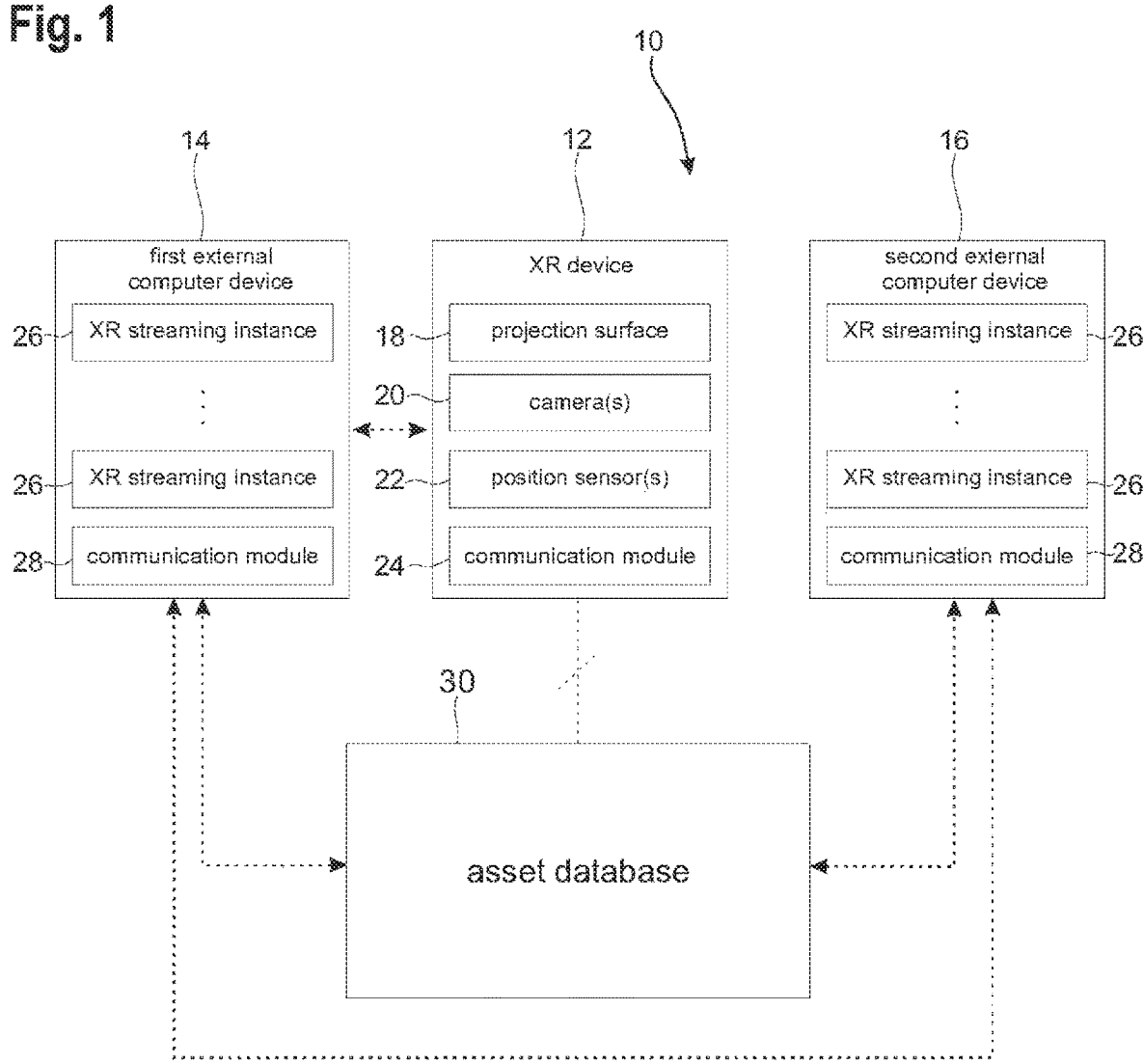
FIG. 1 schematically shows a block diagram of an XR streaming system according to the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

FIG. 1 schematically shows a block diagram of an XR streaming system 10 comprising an XR device 12 and a first external computer device 14.

As is indicated by the dashed arrow, the first external computer device 14 is connected with the XR device 12 in a signal-transmitting manner.

The XR streaming system 10 further comprises a second external computer device 16. The second external computer device 16 is connectable to the XR device 12, but may currently not be connected with the XR device 12.

Therein and in the following, the terms "connectable", "connected", and "connected in a signal transmitting manner" are understood to denote a cable-based or wireless connection that is configured to transmit signals between the respective devices or components.

It is noted that the XR streaming system 10 shown in FIG. 1 is understood to be exemplary. In fact, the XR streaming system 10 may comprise an arbitrary number of external computer devices and an arbitrary number of user-side XR devices.

In general, the XR device 12 is an electronic device that is configured to display an XR image, i.e. an augmented reality (AR) image, a mixed reality (MR) image, and/or a virtual reality (VR) image.

As is illustrated in FIG. 2, the XR device 12 may, for example, be configured as a head-mounted display, particularly as an electronic wearable having the shape of glasses.

However, it is to be understood that the XR device 12 may be any other XR-capable electronic device, e.g. as a smartphone or as a tablet.

In general, the XR streaming system 10 allows a user to observe and/or interact with virtual objects, particularly virtual 3D objects, that are streamed from at least one of the external computer devices 14, 16 to the XR device 12.

If the XR streaming system 10 is an AR streaming system or an MR streaming system, these virtual objects are embedded into a real environment of the user.

Accordingly, the XR device 12 comprises at least one projection surface 18, wherein an XR image to be displayed is projected onto the projection surface 18, such that the virtual object is displayed to the user.

The projection surface 18 may be a display of the XR device 12.

Optionally, the XR streaming system 10 may comprise at least one handheld input device (not shown in FIG. 1), wherein the user may control the XR streaming system 10 by means of the at least one handheld input device.

For example, the at least one handheld input device may be a pen-shaped device, as a gamepad, or as any other type of suitable input device.

The XR device 12 further may comprise at least one camera 20, at least one position sensor 22, and/or a communication module 24.

Therein and in the following, the terms "circuit" and "module" are each understood to describe suitable hardware, suitable software, or a combination of hardware and software that is configured to have a certain functionality.

The hardware may, inter alia, comprise a central processing unit (CPU), a graphics processing unit (GPU), a field-programmable gate array (FPGA), an application-specific integrated circuit (ASIC), or other types of electronic circuitry.

The at least one camera 20 is configured to capture images of an environment of the XR device 12, particularly of an environment in front of the XR device 12.

Particularly, the at least one camera 20 may be a stereo camera. Alternatively or additionally, the XR device 12 may comprise several cameras with overlapping field of view. Thus, depth-information on images taken by the at least one camera 20 can be determined based on images taken by the at least one camera 20.

The at least one camera 20 may be operable in the visible light spectrum and/or in the infrared spectrum. For example, the XR device 12 may comprise at least one camera 20 being operable in the visible light spectrum, and at least one camera 20 being operable in the infrared spectrum.

The at least one position sensor 22 is configured to determine a position, i.e. a location and/or orientation of the XR device 12.

For example, the at least one position sensor 22 may be a gyroscope, as an acceleration sensor, as a magnetometer, as a global navigation satellite system (GNSS) device, and/or as any other suitable type of position sensor.

The XR device 12 may stream the determined position to the external computer devices 14, 16, such that an XR application running on the external computer devices 14, 16 takes the determined position of the XR device 12 into account.

In general, the first external computer device 14 and the second external computer device 16 may each be any type of electronic computing device that is configured to have the functionality described below.

For example, the external computer devices 14, 16 may be a personal computer, as a laptop, as a notebook, as a MAC, as a tablet, as a smartphone, or as any other type of smart device, respectively.

Preferably, the external computer devices 14, 16 are a server, respectively.

Without restriction of generality, it is assumed in the following that the external computer devices 14, 16 are established as a server, respectively.

The external computer devices 14, 16 may be interconnected with each other, e.g. via a wide area network (WAN) or via the Internet.

The external computer device 14, 16 each comprise a plurality of XR streaming instances 26, and a communication module 28.

Therein and in the following, the term "XR streaming instance" is understood to denote suitable hardware, suitable software, or a combination of hardware and software that is configured to execute a certain XR application.

For example, the XR application may be an engineering application that is configured to generate XR images associated with a 3D model of an object, e.g. of a car, of an engine, or of any other object.

In a particular example, a car may be recognized in at least one image captured by means of the at least one camera of the XR device 12, and may be superimposed with a 3D model of the car.

However, it is to be understood that the XR application may be any other type of augmented reality, mixed reality, or virtual reality application, e.g. a game or a metaverse application, such as a social hub giving a plurality of users access to different XR applications.

In general the XR streaming instances 26 of the external computer devices 14, 16 may be associated with the same or with different XR applications.

Particularly, different XR streaming instances 26 that are implemented on a single server, i.e. on one of the external computer devices 14, 16, may be associated with different XR applications.

Different XR streaming instances 26 that are implemented on different servers may be associated with the same XR application or with different XR applications.

The communication module 24 of the XR device 12 and the communication modules 24, 28 of the external computer devices 14, 16 are configured to communicate with each other.

In fact, image data, sensor data, position data and/or control data may be exchanged between the XR device 12 and the external computer devices 14, 16 by means of the communication modules 24, 28.

Therein, any suitable wireless or cable-based transmission technique may be used by the communication modules 24, 28, e.g. wireless LAN (WLAN), 4G, 5G, Ethernet, etc.

The XR streaming system 10 further comprises an asset database 30, wherein the asset database 30 is connected with the XR streaming instances 26 in a signal-transmitting manner.

As is indicated by the crossed out dashed line in FIG. 1, the asset database 30 is not directly connected with the XR device 12, i.e. there is no direct data transmission between the XR device 12 and the asset database 30.

The asset database 30 may be implemented on a server being different from the first external computer device 14 and the second external computer device 16.

However, it is also conceivable that the asset database 30 is implemented in the first external computer device 14 and/or in the second external computer device 16.

In fact, the asset database and the XR streaming instances 26 may be implemented in a common cloud computing environment established by the external computer devices 14, 16 and, optionally, further servers.

In general, the asset database 30 comprises asset data, namely rendering data and copyright data associated with a plurality of different digital assets.

For example, the digital assets may be a 3D model of a machine, such as a 3D model of a car, a digital painting, or a skin for a player character, respectively.

However, it is to be understood that the digital assets may relate to any other type of digital content having usage rights associated with it.

The rendering data corresponds to data that is necessary for the XR streaming instances 26 to render XR images associated with the respective digital asset.

The copyright data comprises information on an owner of the respective digital asset, as well as information on which XR streaming instances 26 and/or which users or user-side XR devices are allowed to access the respective digital asset.

The copyright data associated with each digital asset may be a blockchain, respectively. Thus, unauthorized manipulations of the copyright data can be immediately detected, as such manipulations usually lead to inconsistencies of the hash-values of the individual blocks of the blockchain. In other words, the copyright data is safe from unauthorized manipulations.

For example, the blockchain may comprise information on a (current) owner of the respective digital asset, information on a transaction history of the respective digital asset, information on usage rights, i.e. which users, XR devices or XR streaming instances 26 are allowed to access the respective digital asset, and/or a hyperlink to the digital asset, particularly a hyperlink to the rendering data associated with the digital asset.

Particularly, the copyright data associated with at least one of the digital assets may be a non-fungible token (NFT). Thus, the copyright data may comprise an NFT for each (unique) digital asset, such that unambiguous copyright information is provided for each unique digital asset.

The XR streaming system 10 is configured to perform an XR streaming method for streaming an XR image stream from at least one of the XR streaming instances 26 to the XR device 12, which is described in the following with reference to FIG. 3.

An asset request is generated by means of the XR streaming instance 26 currently being connected to the XR device 12, wherein the asset request corresponds to a request for a particular digital asset (step S1).

The asset request may comprise user information being associated with a particular user of the XR device 12 or with the XR device 12 itself.

For example, the asset request may comprise a unique identifier associated with the particular user of the XR device 12 being connected to the XR streaming instance 26. Alternatively, the unique identifier may be associated with the XR device 12 itself.

The asset request is transmitted to the asset database 30.

The asset database 30 assesses whether the user of the XR device 12 or the XR device 12 itself is allowed to access the requested digital asset based on the copyright data associated with the requested digital asset (step S2).

Particularly, the asset database 30 may compare the user information comprised in the asset request to the information on usage rights comprised in the copyright data, and may grant or deny access to the digital asset based on the comparison.

If the asset database 30 grants access to the requested digital asset, the rendering data associated with the requested digital asset is transmitted from the asset database 30 to the XR streaming instance 26 connected to the XR device 12 (step S3).

As already described above, the transmitted rendering data corresponds to data that is necessary for the XR streaming instance 26 to render XR images associated with the requested digital asset.

For example, the rendering data comprises 3D model data and/or shader data.

If, however, the asset database 30 denies access to the requested digital asset based on the copyright data, the rendering data associated with the requested digital asset is not transmitted to the XR streaming instance 26.

An XR image stream is generated based on the received rendering data by means of the XR streaming instance 26 having requested the digital asset (step S4).

The XR image stream corresponds to a series of XR images, wherein the XR images are rendered by means of the XR streaming instance based on the rendering data received from the asset database 30.

The XR image stream is transmitted to the XR device 12 (step S5).

The XR image stream transmitted to the XR device 12 may then be displayed on the projection surface 18 of the XR device 12.

It is emphasized that only the rendered XR images, namely the XR image stream, are transmitted to the XR device 12, while the rendering data used for rendering the XR images is not transmitted to the XR device 12.

In other words, the rendering data always stays within the computing environment established by the external computer devices 14, 16 and the asset database 30, which may be operated by a single company.

Thus, there is no risk of the rendering data being copied by the user-side XR device 12 without permission of the owner of the corresponding digital asset.

Certain embodiments disclosed herein, particularly the respective module(s) and/or unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a CPU, a digital signal processor (DSP), an ASIC, an FPGA, a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. A system comprising an asset database, at least one extended reality (XR) streaming instance, and an XR device,
    wherein the at least one XR streaming instance is implemented on at least one server, wherein the XR streaming instance comprises hardware, or a combination of hardware and software being configured to execute an XR application,
    wherein the asset database is configured to store asset data that is associated with a plurality of different digital assets, wherein the asset data comprises rendering data and copyright data associated with each digital asset,
    wherein the rendering data corresponds to data that is necessary for the at least one XR streaming instance to render an XR image associated with the respective digital asset, wherein the rendering data comprises 3D model data,
    wherein the XR streaming instance is configured to generate an asset request, wherein the asset request corresponds to a request for a particular digital asset,
    wherein the asset database is configured to transmit the rendering data associated with the requested digital asset to the at least one XR streaming instance based on the asset request and based on the copyright data, and
    wherein the at least one XR streaming instance is configured to generate an XR image stream based on the transmitted rendering data,
    wherein the XR streaming instance is configured to transmit the XR image stream to the XR device, wherein the XR device is configured to display the XR image stream, wherein the XR device is a portable electronic device, and
    wherein the rendering data is not transmitted to the XR device.

2. The system of claim 1, wherein the asset database is connectable with a plurality of different XR streaming instances simultaneously.

3. The system of claim 2, wherein different XR streaming instances are configured to execute the same or different XR applications.

4. The system of claim 1, wherein the rendering data further comprises shader data.

5. The system of claim 1, wherein the copyright data associated with each digital asset is based on a blockchain.

6. The system of claim 5, wherein the copyright data associated with at least one of the digital assets is a non-fungible token.

7. The system of claim 1, wherein the asset database is a cloud database being distributed over a plurality of servers.

8. The system of claim 7, wherein the copyright data is saved on a single server, or wherein the copyright data is saved on a predefined subset of the plurality of servers or on all servers of the plurality of servers.

9. The system of claim 1, wherein the at least one XR streaming instance and the asset database are implemented on the same server or on the same plurality of servers.

10. The system of claim 1, wherein the XR device is a head-mounted display, a smartphone, or a tablet.

11. The system of claim 1, wherein the asset request and the copyright data each comprise user information being associated with a particular user.

12. The system of claim 1, wherein the asset database is configured to transmit the rendering data associated with the requested digital asset to the at least one XR streaming instance based on a determination that access to the requested digital asset is granted based on the copyright data.

13. A method comprising:
    generating, by at least one extended reality (XR) streaming instance, an asset request, wherein the asset request corresponds to a request for a particular digital asset, wherein the at least one XR streaming instance is implemented on at least one server, wherein the XR streaming instance comprises hardware, or a combination of hardware and software being configured to execute an XR application;
    transmitting the asset request to an asset database, wherein the asset database is configured to store asset data that is associated with a plurality of different digital assets, wherein the asset data comprises rendering data and copyright data associated with each digital asset;
    transmitting, from the asset database, the rendering data associated with the requested digital asset to the at least one XR streaming instance based on the asset request and based on the copyright data, wherein the rendering data comprises 3D model data;
    generating, by the at least one XR streaming instance, an XR image stream based on the transmitted rendering data;
    transmitting the XR image stream to an XR device, wherein the rendering data is not transmitted to the XR device; and
    displaying, by the XR device, the XR image stream.

14. The method of claim 13, wherein transmitting the rendering data associated with the requested digital asset to the at least one XR streaming instance is based on determining that access to the requested digital asset is granted based on the copyright data.

15. The method of claim 13, wherein the rendering data further comprises shader data.

16. The method of claim 13, wherein the copyright data associated with each digital asset is based on a blockchain.

17. The method of claim 16, wherein the copyright data associated with at least one of the digital assets is a non-fungible token.

18. One or more non-transitory computer-readable memories with instructions stored thereon, the instructions to:
    generate, by an extended reality (XR) streaming instance, an asset request, wherein the asset request corresponds to a request for a particular digital asset, wherein the XR streaming instance is implemented on at least one server, wherein the XR streaming instance comprises hardware, or a combination of hardware and software being configured to execute an XR application;
    transmit the asset request to an asset database, wherein the asset database is configured to store asset data that is associated with a plurality of different digital assets, wherein the asset data comprises rendering data and copyright data associated with each digital asset;

transmit, from the asset database, the rendering data associated with the requested digital asset from the asset database to the XR streaming instance based on the asset request and based on the copyright data, wherein the rendering data comprises 3D model data;

generate, by the XR streaming instance, an XR image stream based on the transmitted rendering data;

transmit the XR image stream to an XR device, wherein the rendering data is not transmitted to the XR device; and display, by the XR device, the XR image stream.

19. The non-transitory computer-readable memories of claim 18, wherein the instructions to transmit the rendering data associated with the requested digital asset from the asset database to the XR streaming instance comprise instructions to transmit the rendering data based on a determination that access to the requested digital asset is granted based on the copyright data.

20. The non-transitory computer-readable memories of claim 18, wherein the XR device is a head-mounted display, a smartphone, or a tablet, wherein the instructions to transmit the XR image stream to the XR device comprise instructions to transmit the XR image stream to the head-mounted display, smartphone, or tablet.

* * * * *